(12) United States Patent
Boeddinghaus et al.

(10) Patent No.: US 12,079,699 B1
(45) Date of Patent: Sep. 3, 2024

(54) VERIFYING THE PROVENANCE OF A MACHINE LEARNING SYSTEM

(71) Applicant: DAIKI GmbH, Vienna (AT)

(72) Inventors: Jona Boeddinghaus, Staufen im Breisgau (DE); Mauritz Kop, Herten (NL); Paolo Campigotto, Vienna (AT); Artur Susdorf, Breisach am Rhein (DE)

(73) Assignee: DAIKI GmbH (AT)

( * ) Notice: Subject to any disclaimer, the term of this patent is extended or adjusted under 35 U.S.C. 154(b) by 0 days.

(21) Appl. No.: 18/514,202

(22) Filed: Nov. 20, 2023

(51) Int. Cl.
*G06N 20/00* (2019.01)

(52) U.S. Cl.
CPC .................................. *G06N 20/00* (2019.01)

(58) Field of Classification Search
CPC .............................. G06N 20/00; H04L 9/3236
See application file for complete search history.

(56) References Cited

U.S. PATENT DOCUMENTS

| | | | | |
|---|---|---|---|---|
| 11,797,672 B1* | 10/2023 | Beveridge | ............. | G06N 3/045 |
| 2020/0162266 A1* | 5/2020 | Miller | .................. | H04L 9/3239 |
| 2020/0234121 A1* | 7/2020 | Stapleton | ................. | G06N 3/02 |
| 2020/0311248 A1* | 10/2020 | Dwarakanath | ....... | G06V 10/774 |
| 2020/0341957 A1* | 10/2020 | Richards | ............... | G06F 16/116 |

OTHER PUBLICATIONS

Andrei Z. Broder, Identifying and Filtering Near-Duplicate Documents, CPM 2000, LNCS 1848, 2000, pp. 1-10.

* cited by examiner

*Primary Examiner* — Dave Misir
(74) *Attorney, Agent, or Firm* — Van Pelt, Yi & James LLP (57) ABSTRACT

A header associated with a machine learning system, metadata associated with the machine learning system, and content associated with the machine learning system are received. A digital envelope corresponding to the machine learning system is generated based on the received header, the received metadata, and the received content. The generated digital envelope corresponding to the machine learning system includes a first value corresponding to the header associated with the machine learning system and a combined value corresponding to the metadata associated with the machine learning system and the content associated with the machine learning system.

20 Claims, 5 Drawing Sheets

VERIFYING THE PROVENANCE OF A MACHINE LEARNING SYSTEM

BACKGROUND OF THE INVENTION

Regulations demand transparency and human oversight of artificial intelligence (AI) and/or machine learning (ML) systems. One central requirement and technical challenge is the unambiguous identification and monitoring of deployed AI/ML systems including identifying the responsible owner and developer of such systems.

Responsible AI systems must be closely monitored in their applications for (technical) problems like data drift, unseen events, misuse etc. However, it is difficult to accurately identify distinct models (including their exact version), their data (lineage) and the producers of such models.

Furthermore, correctly identifying the provenance and the ownership of an AI system is crucial to prevent adversarial attacks. AI systems like large language models (LLM) are randomized algorithms, therefore testing for equality of two LLMs A and B can only be performed on a statistical basis. It is possible to surgically modify a machine learning model to behave like another model for the vast majority of the inputs.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to verify the provenance of a machine learning system is disclosed. The technique enables a user to determine whether a version of a machine learning system being implemented is an authentic version of the machine learning system or a malicious version of the machine learning system. The malicious version of the machine learning system may have been developed by a malicious actor attempting to extract sensitive or private information that was inputted into the machine learning system. The technique also enables a user to determine which version of a machine learning system is currently being implemented. In response to such a determination, the user may decide to revert back to a previous version of the machine learning system in the event the user is experiencing one or more problems with the current version of the machine learning system.

The technique includes receiving a header associated with a machine learning system, metadata associated with the machine learning system, and content associated with the machine learning system. The header associated with the machine learning system includes one or more pieces of information, such as a name of the machine learning system, a version of code associated with the machine learning system, a version of the machine learning system, a type of the machine learning system, and a value indicating whether the machine learning system is associated with a previous machine learning system. The metadata associated with the machine learning system includes a plurality of fields. The values associated with the plurality of fields describe the machine learning system. The content associated with the machine learning system may include one or more files. The content is encoded in data chunks. The machine learning system may be a trained large language model, a trained supervised machine learning system, a trained unsupervised machine learning system, a trained semi-supervised machine learning system, a trained reinforced learned machine learning system, etc.

The technique includes generating a digital fingerprint based on the header associated with the machine learning system, the metadata associated with the machine learning system, and the content associated with the machine learning system. The digital fingerprint is comprised of a first value that corresponds to the header associated with the machine learning system, a second value that corresponds to the metadata associated with the machine learning system, and a third value that corresponds to the content associated with the machine learning system.

The one or more pieces of information associated with the header used to generate the first value of the digital fingerprint is the same for each machine learning system for which the provenance is being verified. That is, a machine learning system verifier may require a first piece of header information, a second piece of header information, and a third piece of header information to generate the first value of the digital fingerprint. A first user associated with a first machine learning system needs to provide the three pieces of header information, a second user associated with a second machine learning system needs to provide the three pieces of header information, . . . , and an nth user associated with an nth machine learning system needs to provide the three pieces of header information. This enables different machine learning models to be compared to each other. The machine learning system verifier is configured to generate the first value of the digital fingerprint based on corresponding values associated with the provided pieces of information. For example, the first value of the digital fingerprint may be "RGFpaXBsZSwgbWV0Y".

The plurality of fields used to generate the second value of the digital fingerprint is the same for each machine learning system for which the provenance is being verified. That is, a machine learning system verifier may require values for a particular set of data fields. For example, the machine learning system verifier may require values for twenty different data fields. A first user associated with a first machine learning system needs to provide values for the twenty different data fields, a second user associated with a second machine learning system needs to provide values for the same twenty different data fields, . . . , and an nth user associated with an nth machine learning system needs to provide values for the same twenty different data fields. This also enables different machine learning models to be compared to each other. The machine learning system verifier is configured to generate the second value of the digital fingerprint based on corresponding values associated with the particular set of data fields. For example, the second value of the digital fingerprint may be "WRhdGEgd2L0aCBtb2RlbCBj".

The content associated with the machine learning system is used to generate the third value of the digital fingerprint. For example, the third value of the digital fingerprint may be "YXJkIGFuZCBhaSBzeXN0ZW0=".

The digital fingerprint is comprised of the first value, the second value, and the third value. In the above example, the digital fingerprint may be represented as "RGFpaXBsZSwgbWVOYWRhdGEgd2L0aCBtb2RlbCBjYXJkIGFuZCBhaSBzeXN0ZW0=".

The digital fingerprint may be represented by any order of the different fingerprint values. For example, the digital fingerprint may be represented as {first value, second value, third value}, {first value, third value, second value}, {second value, first value, third value}, {second value, third value, first value}, {third value, first value, second value}, or {third value, second value, first value}.

A digital envelope is generated based on the first value of the digital fingerprint, the second value of the digital fingerprint, and the third value of the digital fingerprint. The first value of the digital fingerprint corresponding to the one or more pieces of received header information associated with a machine learning system is not encrypted (i.e., remains clear). This enables a first machine learning system to be compared to a second machine learning system without having to decrypt this part of the digital envelope. This also reduces the amount of time and resources needed to compare two different machine learning systems. For example, the digital envelope may include a first part "WRhdGEgd2L0aCBtb2RlbCBj".

The second value of the digital fingerprint corresponding to the received metadata associated with the machine learning system and the third value of the digital fingerprint corresponding to the received content associated with the machine learning system are encrypted. In some embodiments, the second value of the digital fingerprint and the third value of the digital fingerprint are combined and encrypted together. For example, the encrypted value may be "b3BlbnNzaC1rZXktdjEAAA AACmFlczl1Ni1jdH1AAAAGYmNyeXB0AAAA-GAAAABDQe9Pv0A". The combined value may be encrypted using public key encryption with modern elyptic curve algorithms, homomorphic encryption techniques, quantum secure key exchange mechanisms, or other types of encryption algorithms. Homomorphic encryption allows similarity matching on encrypted data: two values can be compared for similarity or equality without unsealing the digital envelope. This allows comparison and conflict resolution between users and machine learning system providers as well as between machine learning system providers with maximum security and minimum risk of information disclosure. In some embodiments, the second value of the digital fingerprint and the third value of the digital fingerprint are separately encrypted.

The digital envelope is stored in a database. The database may be a local database or a distributed database (including on a distributed ledger). The database is configured to store a plurality of digital envelopes. The digital envelope enables the machine learning verifying system to compare a first machine learning system with one or more other machine learning systems to determine if they are the same machine learning system.

Figure 1:
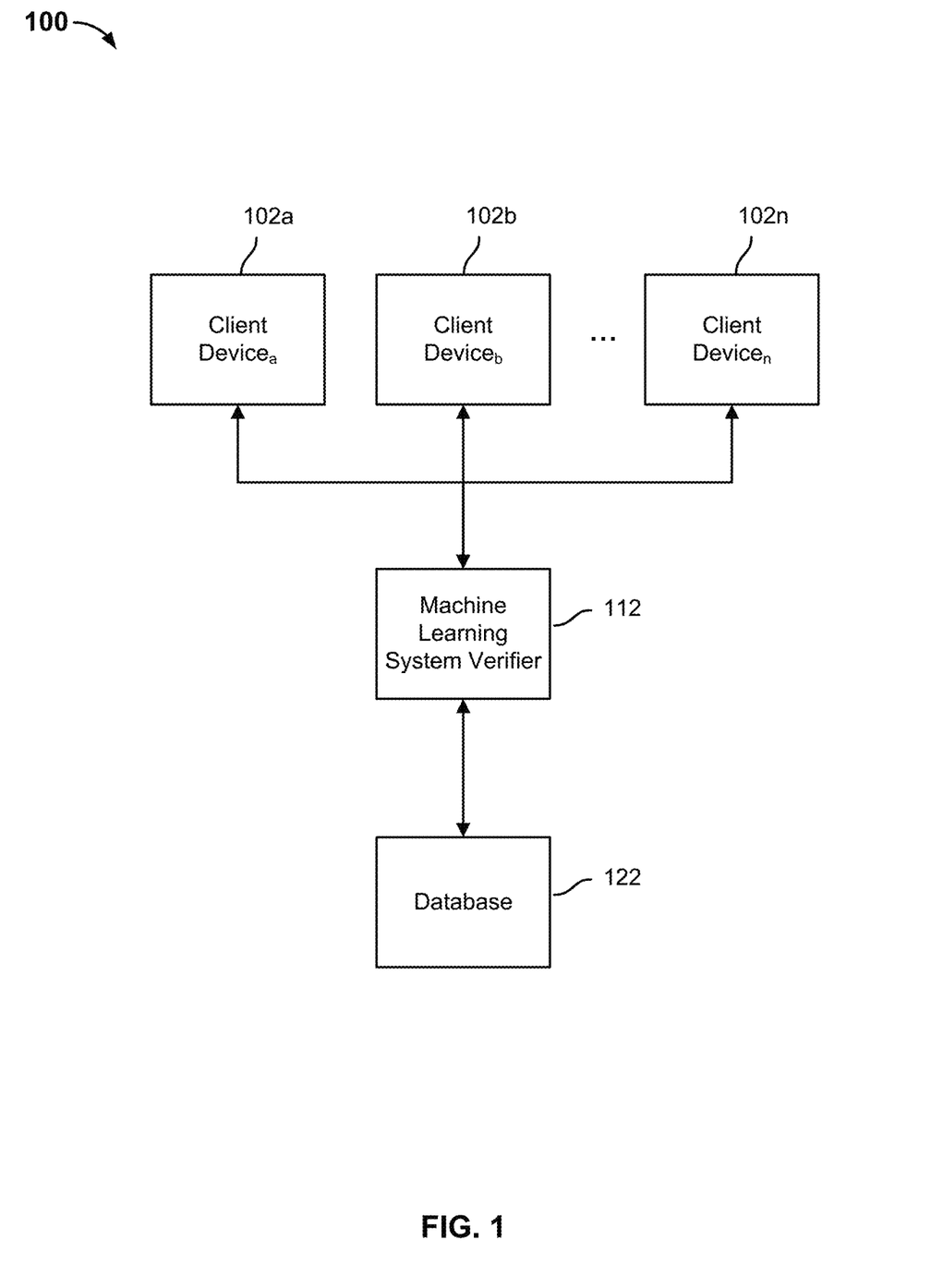
FIG. 1 is a block diagram illustrating a system to verify the provenance of a machine learning system in accordance with some embodiments.

FIG. 1 is a block diagram illustrating a system to verify the provenance of a machine learning system in accordance with some embodiments. In the example shown, system 100 includes a first client device 102a, a second client device 102b, and a third client device 102n in communication with machine learning system verifier 112. Although FIG. 1 depicts machine learning system verifier 112 as being in communication with three client devices, machine learning system verifier 112 may be communicating with 1:n communication devices.

A client device may be laptop, a personal computer, a server, a smart device, a cell phone, a tablet, or any other computing device capable of running a machine learning system, such as a large language model. The client device may be in wireless or wired communication with machine learning system verifier 112. A client device may communicate with machine learning system verifier 112 over cellular, an intranet, the Internet, Bluetooth, or any other wireless protocol.

Machine learning system verifier 112 may be comprised of one or more central processing units, one or more graphical processing units, one or more virtual machines, one or more containers, or any other computing device. In some embodiments, machine learning system verifier 112 is located in a cloud environment. The cloud environment may be a public cloud or a private cloud. In some embodiments, machine learning system verifier 112 is located on-prem.

A client device, such as client devices 102a, 102b, . . . , 102n, may send to machine learning system verifier 112 a request to verify the provenance of a machine learning system. The request includes a header associated with machine learning system, metadata associated with the machine learning system, and content associated with the machine learning system.

The header associated with the machine learning system may be comprised of one or more pieces of information, such as:

| Name | Name of the System | UTF-8 encoded, 1 Byte similarity hash |
|---|---|---|
| Code Version | Version of the Code Version of the System | 1 Byte, positive integer 1 Byte, positive integer |
| Type | Type of the System | 1 Byte (0, 1, 2) |
| PreviousCode | Code of a linked Fingerprint | FINGERPRINT Value |

The name of the machine learning system may be an arbitrary string. It may have a fixed length, such as 64 characters. Names shorter than the fixed length may be padded with white spaces on the right. The version of the code may be represented as a positive integer. The version of the machine learning system is a positive integer. A machine learning system may have a maximum version number of 255. The machine learning system may be renamed in the event the number of version numbers exceeds 255. The type value represents the type of machine learning system. A value of "0" may correspond to a non-specified type of machine learning system, a value of "1" may correspond to a general machine learning system, and a value of "2" may correspond to a high risk machine learning system. The 4-byte format is intentionally not optimized for space but for flexibility and compatibility.

The PreviousCode may contain a value associated with a previous machine learning system, such as the digital fingerprint associated with the previous machine learning system. The machine learning system being verified may correspond to a subsequent version of the previous machine learning system. In some embodiments, a machine learning system is an initial version of the machine learning system and the PreviousCode field stores a null or "0" value.

The metadata associated with the machine learning system may be comprised of a plurality of fields, such as:

| | | | |
|---|---|---|---|
| System Details | SD: Organization | Organization developing or publishing the System | UTF-8 encoded string, 64 characters |
| System Details | SD: Type | System Type, e.g. classifier, assistant | UTF-8 encoded string, 32 characters |
| System Details | SD: Version | System Version, same as in Header | UTF-8 encoded string, 4 characters (should equal Header version) |
| System Details | SD: Date | Publication Data | String, format,, YYYY-MM-DD" |
| System Details | SD: Training | Training Algorithm, short description | UTF-8 encoded string, 128 characters |
| System Details | SD: Paramters | Important Algorithm parameters, comma-seperated | UTF-8 encoded string, 128 characters |
| System Details | SD: Citation | How to cite this system in publications | UTF-8 encoded, 128 characters |
| System Details | SD: License | License of the system | UTF-8 encoded string, 128 characters |
| System Details | SD: Contact | Point of contact, see organization | UTF-8 encoded string, 128 characters |
| Intended Use | IU: UseCase | Primary use case | UTF-8 encoded string, 256 characters |
| Intended Use | IU: Users | Primary users | UTF-8 encoded string, 256 characters |
| Intended Use | IU: OutOfScope | Out of scope use cases | UTF-8 encoded string, 256 characters |
| Factors | FA: Relevant | Relevant Factors | UTF-8 encoded string, 256 characters |
| Factors | FA: Evaluation | Evaluation Factors | UTF-8 encoded string, 256 characters |
| Metrics | ME: Evaluation | AI System Evaluation Metrics | UTF-8 encoded string, 256 characters |
| Metrics | ME: Thresholds | AI System Decision Thresholds | UTF-8 encoded string, 256 characters |
| Metrics | ME: Variation | Variation approaches | UTF-8 encoded string, 256 characters |
| Datasets | DA: Name | Name of used datasets, comma-seperated | UTF-8 encoded string, 256 characters |
| Datasets | DA: Type | Types of used datasets, comma-seperated | UTF-8 encoded string, 256 characters |
| Datasets | DA: Size | Size of datasets, comma-seperated numbers, size in rows, tokens or GB | UTF-8 encoded string, 128 characters |
| Datasets | DA: Origin | Origin and provenance of training data used | UTF-8 encoded string, 256 characters |
| Datasets | DA: Sample Training | Condensed example of training data | UTF-8 encoded string, 256 characters |

-continued

| | | | |
|---|---|---|---|
| Datasets | DA: SampleInput | Condensed example of input data | UTF-8 encoded string, 256 characters |
| Datasets | DA: SampleOutput | Condensed example of output data | UTF-8 encoded string, 256 characters |
| Evaluation | EV: Data | Description of data used for AI system evaluation | UTF-8 encoded string, 256 characters |
| Evaluation | EV: Methods | Methods used for AI system evaluation | UTF-8 encoded string, 256 characters |
| Evaluation | EV: Results | Evaluation results, known limitations | UTF-8 encoded string, 256 characters |
| Evaluation | EV: Report | Link to an evaluation report, static URL or DOI | UTF-8 encoded string, 128 characters |
| Ethics | ET: Risk | Ethical Risk analysis, summary | UTF-8 encoded string, 256 characters |
| Ethics | ET: Contact | Contact at organization for ethical questions | UTF-8 encoded string, 256 characters |
| Ethics | ET: Report | Link to an ethics report, static URL or DOI | UTF-8 encoded string, 128 characters |
| Ethics | ET: Reco mendedUse | Recommended use of the AI system | UTF-8 encoded string, 256 characters |
| Ethics | ET: Caveats | Caveats, non-intended use | UTF-8 encoded string, 256 characters |

The plurality of fields may include one or more system detail fields. For example, the one or more system detail fields may include a data field for a description of an organization developing or publishing the machine learning system, a data field for a description of a type of the machine learning system (e.g., classifier, assistant, etc.), a data field for a description of a version of the machine learning system, a data field for a description of publication data associated with the machine learning system, a data field for a description of a training algorithm used to train the machine learning system, a data field for a description of one or more parameters used to train the machine learning system, a data field for a description of how to cite the machine learning system in a publication, a data field for a description of a license of the machine learning system, and/or a data field for a description of point of contact within an organization associated with the machine learning system.

The plurality of fields may include one or more intended use fields. For example, the one or more intended use fields may include a data field for a description of a primary use case associated with the machine learning system, a data field for a description of one or more primary users associated with the machine learning system, and/or a data field for a description of one or more out of scope use cases associated with the machine learning system.

The plurality of fields may include one or more factors fields. For example, the one or more factors fields may include a data field for a description of one or more relevant factors and/or a data field for a description of one or more evaluation factors.

The plurality of fields may include one or more metric fields. For example, the one or more metric fields may include a data field for a description of the machine learning system evaluation metric(s), a data field for a description of the machine learning system decision threshold(s), and/or a data field for a description of variation approaches.

The plurality of fields may include one or more dataset fields. For example, the one or more data set fields may include a data field for a description of the datasets used to train the machine learning system, a data field for a description of the types of datasets used to train the machine learning system, a data field for a description of the size of the datasets used to train the machine learning system, a data field for a description of the origin and provenance of the training data used, a data field for a description of a condensed example of the training data, a data field for a description of a condensed example of input data, and/or a data field for a description of a condensed example of output data.

The plurality of fields may include one or more evaluation fields. For example, the one or more evaluation fields may include a data field for a description of data used for an evaluation of the machine learning system, a methods field for a description of the method(s) used for evaluation of the machine learning system, a results field for a description of evaluation results and/or known limitation(s), and/or a report field for a link to an evaluation report.

The plurality of fields may include one or more ethics fields. For example, the one or more ethics fields may include a risk field for a summary of an ethical risk analysis, a contact field for a contact at an organization for ethical questions, a report field for a link to an ethics report, a recommended use field for a recommended use of the machine learning system, and/or a caveats field for caveats and/or non-intended use.

The content associated with the machine learning system may include one or more files. The content is encoded in data chunks. The same content and metadata will always result in the same similarity hash. Therefore, the machine learning system fingerprint can be used to automatically distinguish between different versions of the same content, to ensure data integrity, or to disambiguate content in a given content store. The machine learning system fingerprint also allows variants of a machine learning system to be clustered together based on how similar or different they are from each other.

Machine learning system verifier 112 is configured to generate a digital fingerprint based on the header associated with the machine learning system, the metadata associated with the machine learning system, and the content associated with the machine learning system. The digital fingerprint is comprised of a first value that corresponds to the header associated with the machine learning system, a second value that corresponds to the metadata associated with the machine learning system, and a third value that corresponds to the content associated with the machine learning system.

Machine learning system verifier 112 is configured to generate the first value of the digital fingerprint based on corresponding values associated with the provided pieces of information included in the header associated with the machine learning system. Machine learning system verifier 112 is configured to generate the second value of the digital fingerprint based on corresponding values associated with the particular set of data fields included in the metadata associated with the machine learning system. Machine learning system verifier 112 is configured to generate the third value of the digital fingerprint based on the content associated with the machine learning system.

The digital fingerprint is comprised of the first value, the second value, and the third value. The digital fingerprint may be represented by any order of the different fingerprint values. For example, the digital fingerprint may be represented as {first value, second value, third value}, {first value, third value, second value}, {second value, first value, third value}, {second value, third value, first value}, {third value, first value, second value}, or {third value, second value, first value}.

Machine learning system verifier 112 is configured to generate a digital envelope based on the first value of the digital fingerprint, the second value of the digital fingerprint, and the third value of the digital fingerprint. The first value of the digital fingerprint corresponding to the one or more pieces of received header information associated with a machine learning system is not encrypted (i.e., remains clear). This enables a first machine learning system to be compared to a second machine learning system without having to decrypt this part of the digital envelope. This also reduces the amount of time and resources needed to compare two different machine learning systems. The second value of the digital fingerprint corresponding to the received metadata associated with the machine learning system and the third value of the digital fingerprint corresponding to the received content associated with the machine learning system are encrypted. In some embodiments, the second value of the digital fingerprint and the third value of the digital fingerprint are combined and encrypted together. Machine learning system verifier 112 may encrypt the combined value using public key encryption with modern elyptic curve algorithms, homomorphic encryption techniques, quantum secure key exchange mechanisms, or other types of encryption algorithms. Homomorphic encryption allows similarity matching on encrypted data: two values can be compared for similarity or equality without unsealing the digital envelope. This allows comparison and conflict resolution between users and machine learning system providers as well as between machine learning system providers with maximum security and minimum risk of information disclosure. In some embodiments, machine learning system verifier 112 separately encrypts the second value of the digital fingerprint and the third value of the digital fingerprint.

Machine learning system verifier 112 is configured to store the digital envelope in database 122. Database 122 may be a local database or a distributed database. Database 122 is configured to store a plurality of digital envelopes. The digital envelope enables the machine learning verifying system to compare a first machine learning system with one or more other machine learning systems to determine if they are the same machine learning system. In some embodiments, database 122 is located in the The generated digital envelope is comprised of a first value corresponding to the one or more pieces of information corresponding to the header associated with the machine learning system, a second value corresponding to values associated with the plurality of fields corresponding to the metadata associated with the machine learning system, and a third value corresponding to the content associated with the machine learning system. The first value corresponding to the one or more pieces of information corresponding to the header associated with machine learning system is not encrypted (i.e., remains clear). This enables a first machine learning system to be compared to a second machine learning system without having to decrypt the first value. This reduces the amount of time and resources needed to compare two different machine learning systems.

Machine learning system verifier 112 is configured to combine the second value value corresponding to values associated with the plurality of fields corresponding to the metadata associated with the machine learning system and the third value corresponding to the content associated with the machine learning system. The combined value is encrypted. The combined value may be encrypted using public key encryption with modern elyptic curve algorithms, homomorphic encryption techniques, quantum secure key exchange mechanisms, or other types of encryption algorithms.

Machine learning system verifier 112 is configured to generate a digital fingerprint for the machine learning system based on the digital envelope. The first value corresponding to the one or more pieces of information corresponding to the header associated with the machine learning system, the second value corresponding to values associated with the plurality of fields corresponding to the metadata associated with the machine learning system, and the third value corresponding to the content associated with the machine learning system are combined into a single value, which corresponds to the digital fingerprint for a machine learning system.

Machine learning system verifier 112 is configured to store the digital fingerprint in database 122. Database 122 may be a local database or a distributed database. Database 122 is configured to store a plurality of digital fingerprints. The digital fingerprint enables machine learning verifying system 112 to compare a first machine learning system with one or more other machine learning systems to determine if they are the same machine learning system.

In some embodiments, database 122 is located in a cloud environment. The cloud environment may be a public cloud or a private cloud. In some embodiments, database 122 is located in the same cloud environment as machine learning system verifier 112. In some embodiments, database 122 is located in a different cloud environment than machine learning system verifier 112. In some embodiments, database 122 is located on-prem.

Figure 2:
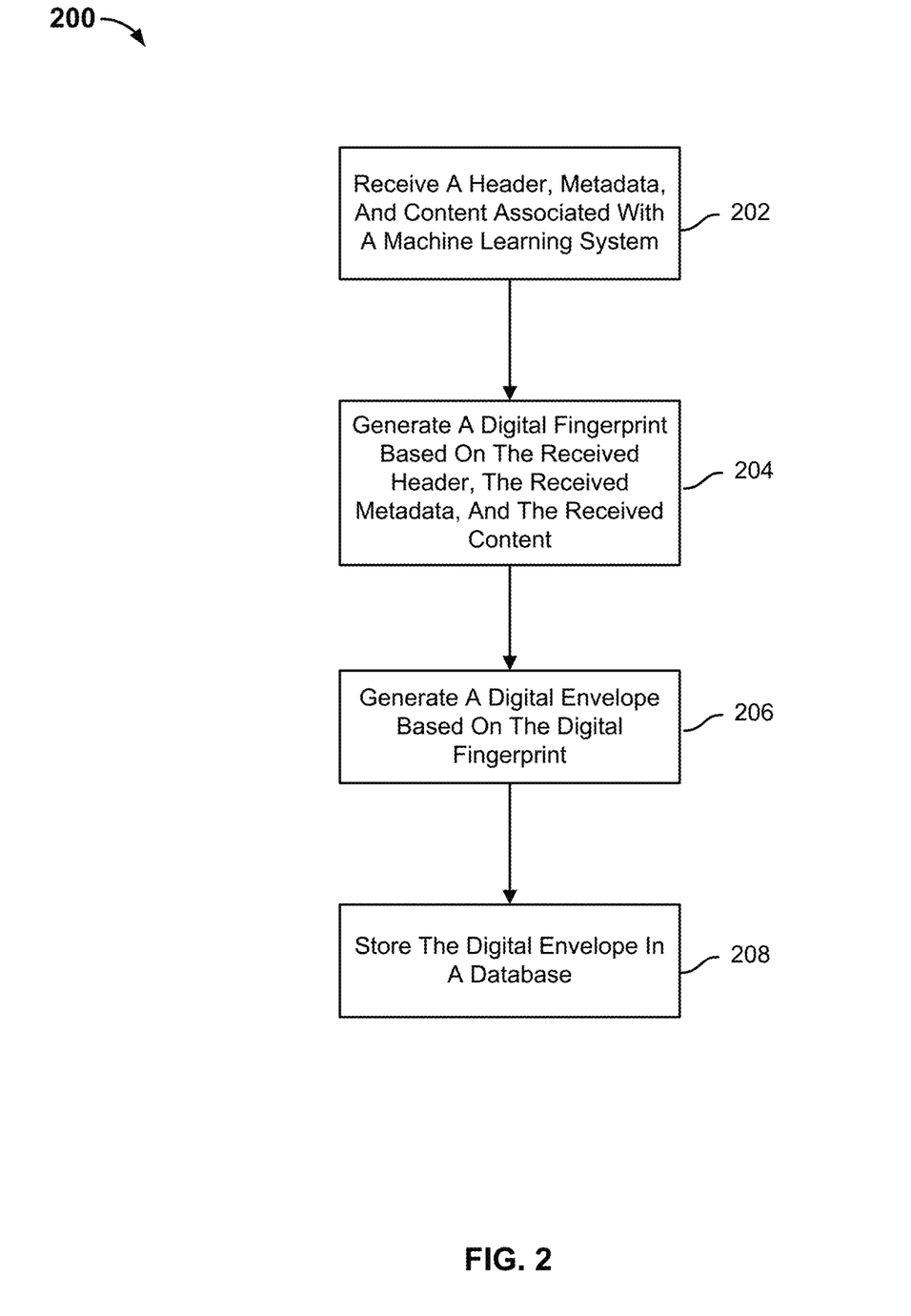
FIG. 2 is a block diagram illustrating a process to verify the provenance of a machine learning system in accordance with some embodiments.

FIG. 2 is a block diagram illustrating a process to verify the provenance of a machine learning system in accordance with some embodiments. In the example shown, process 200 may be implemented by a machine learning system verifier, such as machine learning system verifier 112.

At 202, a header associated with a machine learning system, metadata associated with the machine learning system, and content associated with the machine learning system is received. The header associated with the machine learning system includes one or more pieces of information, such as a name of the machine learning system, a version of code associated with the machine learning system, a version of the machine learning system, a type of the machine learning system, and a value indicating whether the machine learning system is associated with a previous machine learning system.

The metadata associated with the machine learning system includes a plurality of fields. The values associated with the plurality of fields describe the machine learning system.

The content associated with the machine learning system may include one or more files.

At 204, a digital fingerprint is generated based on the received header associated with the machine learning system, the received metadata associated with the machine learning system, and the received content associated with the machine learning system. The digital fingerprint is comprised of a first value, a second value, and a third value. The first value of the digital fingerprint is generated based on corresponding values associated with the pieces of information included in the received header associated with the machine learning system. The second value of the digital fingerprint is generated based on corresponding values associated with the particular set of data fields included in the metadata associated with the machine learning system. The third value of the digital fingerprint is generated based on the content associated with the machine learning value.

At 206, a digital envelope is generated based on the generated digital fingerprint. The digital envelope is generated based on the first value of the digital fingerprint, the second value of the digital fingerprint, and the third value of the digital fingerprint. The first value of the digital fingerprint corresponding to the one or more pieces of received header information associated with a machine learning system is not encrypted (i.e., remains clear). This enables a first machine learning system to be compared to a second machine learning system without having to decrypt this part of the digital envelope. This also reduces the amount of time and resources needed to compare two different machine learning systems. The second value of the digital fingerprint corresponding to the received metadata associated with the machine learning system and the third value of the digital fingerprint corresponding to the received content associated with the machine learning system are encrypted. In some embodiments, the second value of the digital fingerprint and the third value of the digital fingerprint are combined and encrypted together. In some embodiments, the second value of the digital fingerprint and the third value of the digital fingerprint are separately encrypted.

At 208, the digital envelope is stored in a database. The database may be a local database or a distributed database. The database is configured to store a plurality of digital envelopes. The digital envelope enables the machine learning verifying system to compare a first machine learning system with one or more other machine learning systems to determine if they are the same machine learning system.

Figure 3:
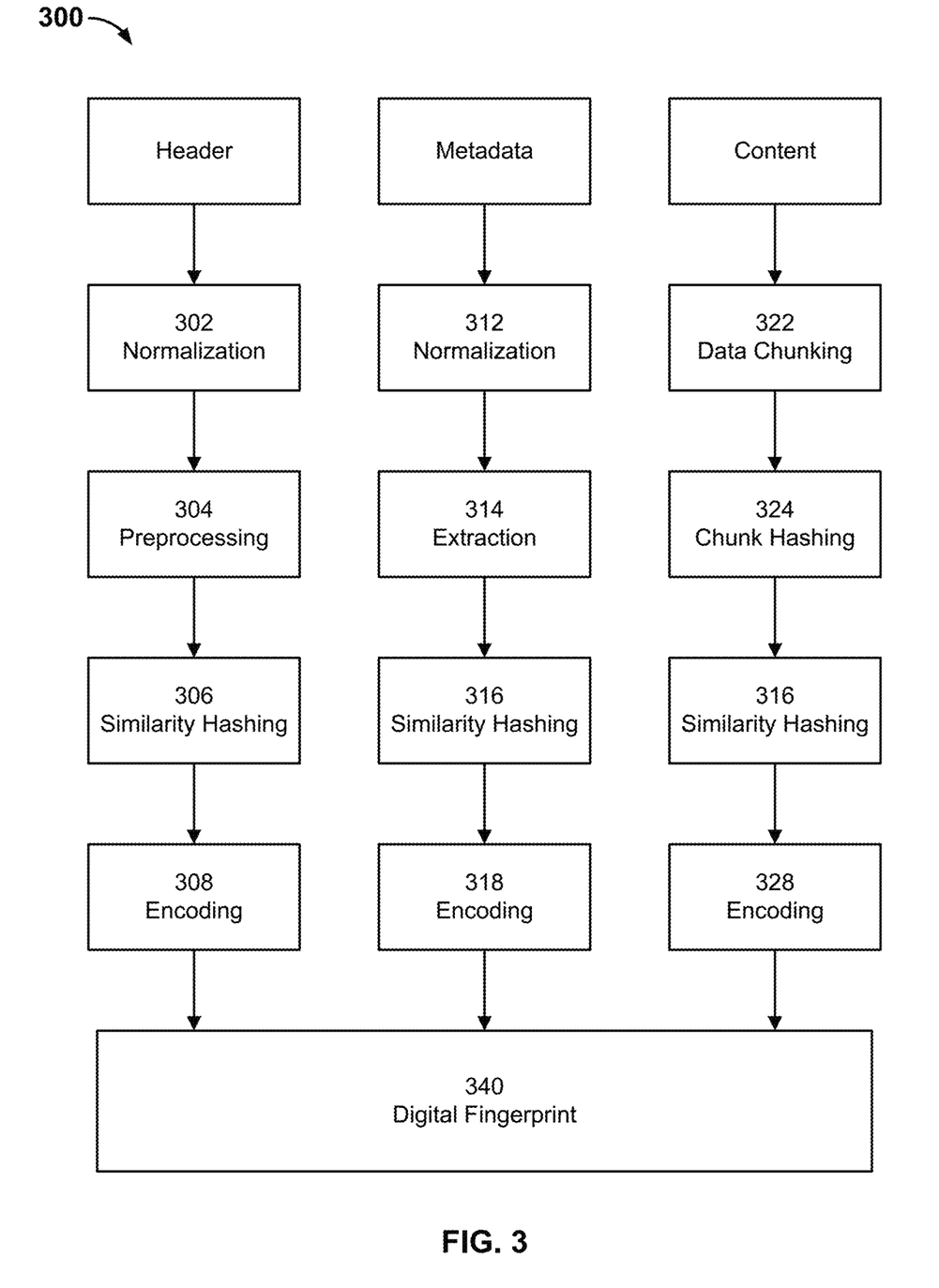
FIG. 3 illustrates a process to generate a digital fingerprint in accordance with some embodiments.

FIG. 3 illustrates a process to generate a digital fingerprint in accordance with some embodiments. In the example shown, process 300 may be implemented by a machine learning system verifier, such as machine learning system verifier 112. In some embodiments, process 300 is implemented to perform some or all of step 204 of process 200.

Digital fingerprint 340 is comprised a first value corresponding to a header associated with a machine leaning system, a second value corresponding to metadata associated with the machine learning system, and a third value corresponding to content associated with the machine learning system.

A first subprocess is utilized to generate the first value corresponding to the header associated with the machine learning system. A second subprocess is utilized to generate the second value corresponding to the metadata associated with the machine learning system. A third subprocess is utilized to generate the third value corresponding to content associated with the machine learning system. In some embodiments, the first subprocess, the second subprocess, and the third subprocess are performed in parallel. In some embodiments, the first subprocess, the second subprocess, and the third subprocess are sequentially performed.

The first subprocess is comprised of steps 302, 304, 306, and 308. At step 302, the header associated with the machine learning system is normalized. The header associated with the machine learning system is comprised of one or more strings. The one or more strings may be normalized by lowercasing any uppercase letters included in the one or more strings. The one or more strings may be normalized by removing any white spaces in the one or more strings.

At 304, the one or more normalized strings are pre-processed in part by utilizing the one or more normalized to generate an n-gram having a particular length. In some embodiments, the generated n-gram has a length of 13.

At 306, similarity hashing is performed on the one or more pre-processed strings. In some embodiments, a Min-Hash or other similarity hashing algorithm is performed on the one or more pre-processed strings.

At 308, the hashed value is encoded. The least significant bits from the similarity hash are obtained. A digest (e.g., 64-bit) is created from the least significant bits. The digest is encoded with base64 so that the digest is outputted as printable text. Other bases (e.g., base32, base128, base256, etc.) may be used. The encoded value corresponds to the first value of digital fingerprint 340.

The second subprocess is comprised of steps 312, 314, 316, and 318. At step 312, metadata associated with the machine learning system is normalized. The metadata associated with the machine learning system is comprised of one or more strings. The one or more strings may be normalized by lowercasing any uppercase letters included in the one or more strings. The one or more strings may be normalized by removing any white spaces in the one or more strings.

At 314, features are extracted from the one or more normalized strings. A hash digest algorithm, such as xxHash32 or xxHash64, takes the one or more normalized strings as input. The hash digest algorithm produces an output of 32 bit or 64 bit value.

At 316, similarity hashing is performed on the one or more extracted features. In some embodiments, a MinHash or other similarity hashing algorithm is performed on the one or more extracted features.

At 318, the hashed value is encoded. The least significant bits from the similarity hash are obtained. A digest (e.g., 64-bit) is created from the least significant bits. The digest is encoded with base64 so that the digest is outputted as printable text. Other bases (e.g., base32, base128, base256, etc.) may be used. The encoded value corresponds to the second value of digital fingerprint 340.

The third subprocess is comprised of steps 322, 324, 326, and 328. At 322, the content associated with the machine learning system is divided into a plurality of data chunks. Each of the plurality of data chunks may have a fixed size (e.g., 4 kb, 8 kb, 16 kb, etc.).

At 324, the plurality of data chunks is hashed using a hashing algorithm.

At 326, similarity hashing is performed on the plurality of hashed chunks. In some embodiments, a MinHash or other similarity hashing algorithm is performed on the plurality of hashed chunks.

At 328, the hashed value is encoded. The least significant bits from the similarity hash are obtained. A digest (e.g., 64-bit) is created from the least significant bits. The digest is encoded with base64 so that the digest is outputted as printable text. Other bases (e.g., base32, base128, base256, etc.) may be used. The encoded value corresponds to the third value of digital fingerprint 340.

A digital fingerprint 340 is generated by combining an output of the first subprocess, an output of the second subprocess, and an output of the third subprocess.

Figure 4:
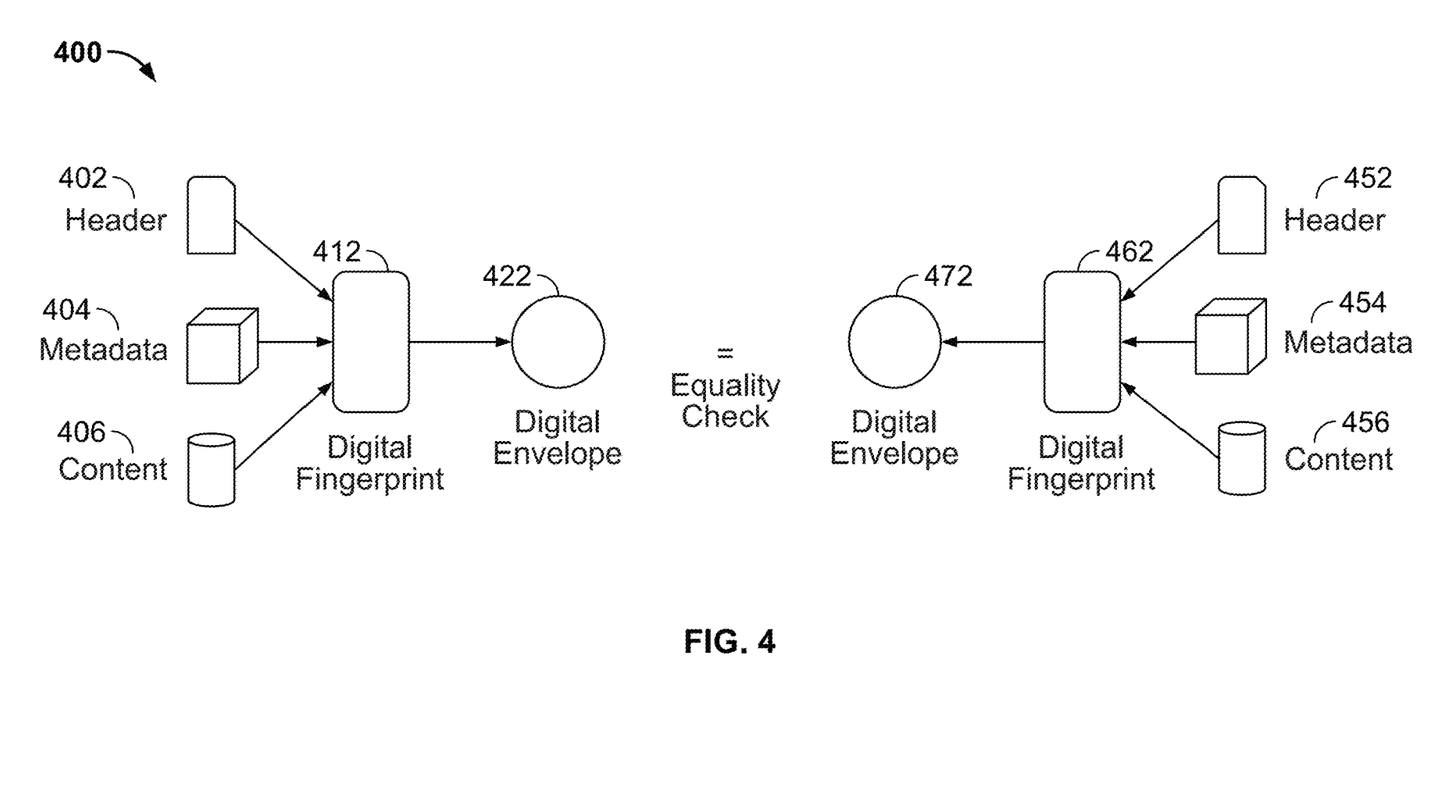
FIG. 4 is a diagram illustrating a process to compare two machine learning systems in accordance with some embodiments.

FIG. 4 is a diagram illustrating a process to compare two machine learning systems in accordance with some embodiments. In the example shown, process 400 may be implemented by a machine learning system verifier, such as machine learning system verifier 112.

A first machine learning system is associated with header 402, metadata 404, and content 406. A second machine learning system is associated with header 452, metadata 454, and content 456. A machine learning system verifier is configured to generate digital fingerprint 412 for the first machine learning system based on header 402, metadata 404, and content 406. The machine learning system verifier is configured to generate digital fingerprint 462 for the second machine learning system based on header 452, metadata 454, and content 456.

Digital fingerprint 412 includes a first value corresponding to header 402, a second value corresponding to metadata 404, and a third value corresponding to content 406. Digital fingerprint 462 includes a first value corresponding to header 452, a second value corresponding to metadata 454, and a third value corresponding to content 456.

The machine learning system verifier is configured to generate digital envelope 422 by encrypting the second value corresponding to metadata 404 and the third value corresponding to content 406. Digital envelope 422 includes the first value corresponding to header 402.

The machine learning system verifier is configured to generate digital envelope 472 by encrypting the second value corresponding to metadata 454 and the third value corresponding to content 456. Digital envelope 472 includes the first value corresponding to header 452.

The machine learning system verifier is configured to determine whether the first machine learning system and the second machine learning system are the same machine learning system. If the first value corresponding to header 402 and the first value corresponding to header 452 are the same, then the machine learning system verifier determines that the first machine learning system and the second machine learning system are the same machine learning system. If the first value corresponding to header 402 and the first value corresponding to header 452 are different, then the machine learning system verifier determines that the first machine learning system and the second machine learning system are different machine learning systems.

In some embodiments, the encrypted portions of digital envelope 422 and digital envelope 472 are decrypted to recreate digital fingerprint 412 and digital fingerprint 462, respectively.

Digital fingerprint 412 and digital fingerprint 462 may be compared to each other to determine the extent to which the first machine learning system and the second machine learning system are similar or different. In some embodiments, a resemblance between digital fingerprint 412 and digital fingerprint 462 is computed to determine the similarity between the two fingerprints. The resemblance is expressed as a set intersection problem and the relative size of intersections is evaluated by a process of random sampling that can be done independently for each machine learning system.

The resemblance $$r(A, B) = \frac{|S_A \cap S_B|}{|S_A \cup S_B|}$$

where $S_A$ is a set of numbers that is a result of fingerprinting a set of shingles in a first machine learning system and $S_B$ is a set of numbers that is a result of fingerprinting a set of shingles in a second machine learning system. A shing is a contiguous subsequence of w tokens contained in the content of a machine learning system.

Figure 5:
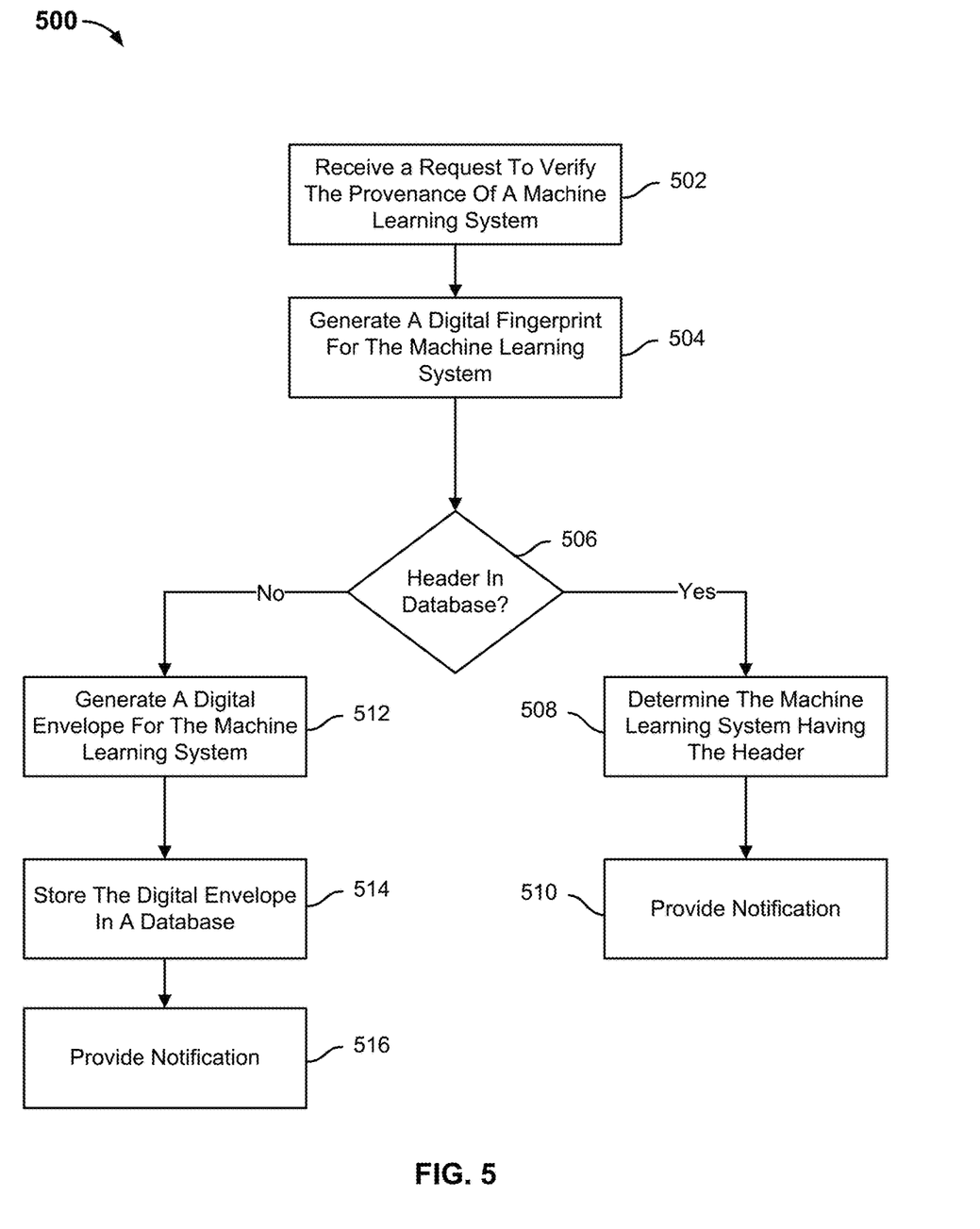
FIG. 5 is a flow diagram illustrating a process to compare machine learning systems in accordance with some embodiments.

FIG. 5 is a flow diagram illustrating a process to compare machine learning systems in accordance with some embodiments. In the example shown, process 500 may be implemented by a machine learning system verifier, such as machine learning system verifier 112.

At 502, a request to verify a provenance of a machine learning system is received. The request includes a header, metadata, and content associated with the machine learning system is received.

At 504, a digital fingerprint is generated for the machine learning system based on the received header, the received metadata, and the received content associated with the machine learning system. The digital fingerprint includes a first value of the digital fingerprint that corresponds to the header associated with the machine learning system, a second value of the digital fingerprint that corresponds to the metadata associated with the machine learning system and a third value of the digital fingerprint that corresponds to the content associated with the machine learning system.

At 506, it is determined whether the first value of the digital fingerprint that corresponds to the header associated with the machine learning system is stored in a database. In response to a determination that the first value of the digital fingerprint that corresponds to the header associated with the machine learning system is stored in the database, process 500 proceeds to step 508. In response to a determination that first value of the digital fingerprint that corresponds to the header associated with the machine learning system is not stored in the database, process 500 proceeds to step 512.

At 508, a machine learning system having the first value of the digital fingerprint is determined.

At 510, a notification is provided. The notification indicates the machine learning system associated with the received header, metadata, and content is the same machine learning system as one previously verified.

At 512, a digital envelope for the machine learning system is generated. The digital envelope for the machine learning system is generated based on the generated digital fingerprint. The digital envelope includes a first part corresponding to the first value of the digital fingerprint that corresponds to the header associated with the machine learning system. The digital envelope includes a second part corresponding to the second value of the digital fingerprint that corresponds to the metadata associated with the machine learning system and the third value of the digital fingerprint that corresponds to the content associated with the machine learning system. The first part of the digital envelope is not encrypted. The second part of the digital envelope is encrypted.

At 514, the digital envelope is stored in a database.

At 516, a notification is provided. The notification indicates the machine learning system associated with the received header, metadata, and content has not been previously verified. In some embodiments, the notification indicates the extent to which the machine learning system is similar to a previously verified machine learning system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of, comprising:
receiving a header associated with a machine learning system, metadata associated with the machine learning system, and content associated with the machine learning system;
generating a digital envelope corresponding to the machine learning system based on the received header, the received metadata, and the received content associated with the machine learning system, wherein the generated digital envelope corresponding to the machine learning system includes a first value corresponding to the header associated with the machine learning system and a combined value corresponding to the metadata associated with the machine learning system and the content associated with the machine learning system, wherein the first value corresponding to the header associated with the machine learning system is unencrypted and the combined value corresponding to the metadata associated with the machine learning system and the content associated with the machine learning system is encrypted;
storing the digital envelope corresponding to the machine learning system;
receiving a header associated with a second machine learning system, metadata associated with the second machine learning system, and content associated with the second machine learning system;
generating a second digital envelope corresponding to the second machine learning system based on the received header, the received metadata, and the received content associated with the second machine learning system, wherein the generated digital envelope corresponding to the second machine learning system includes an additional first value corresponding to the header associated with the second machine learning system and an additional combined value corresponding to the metadata associated with the second machine learning system and the content associated with the second machine learning system, wherein the additional first value corresponding to the header associated with the second machine learning system is unencrypted and the additional combined value corresponding to the metadata associated with the second machine learning system and the content associated with the second machine learning system is encrypted; and
comparing the first value corresponding to the header associated with the machine learning system to the additional first value corresponding to the header associated with the second machine learning system to determine a provenance and authenticity of the second machine learning system.

2. The method of claim 1, wherein the header associated with the machine learning system includes one or more pieces of information.

3. The method of claim 1, wherein the metadata associated with the machine learning system includes corresponding values for a plurality of fields.

4. The method of claim 1, further comprising generating a digital fingerprint associated with the machine learning system based on the header associated with the machine learning system, the metadata associated with the machine learning system, and the content associated with the machine learning system.

5. The method of claim 4, wherein generating the digital fingerprint associated with the machine learning system includes a first subprocess to generate the first value corresponding to the header associated with the machine learning system.

6. The method of claim 5, wherein the first subprocess includes normalizing the header associated with the machine learning system.

7. The method of claim 5, wherein generating the digital fingerprint associated with the machine learning system includes a second subprocess to generate a second value corresponding to the metadata associated with the machine learning system.

8. The method of claim 7, wherein generating the digital fingerprint associated with the machine learning system includes a third subprocess to generate a third value corresponding to the content associated with the machine learning system.

9. The method of claim 8, wherein the first value corresponding to the header associated with the machine learning system, the second value corresponding to the metadata associated with the machine learning system, and the third value corresponding to the content associated with the machine learning system are generated in parallel.

10. The method of claim 8, wherein the first value corresponding to the header associated with the machine learning system, the second value corresponding to the metadata associated with the machine learning system, and the third value corresponding to the content associated with the machine learning system are sequentially generated.

11. The method of claim 8, wherein the second value corresponding to the metadata associated with the machine learning system and the third value corresponding to the content associated with the machine learning system are encrypted together to generate the combined value corresponding to the metadata associated with the machine learning system and the content associated with the machine learning system.

12. The method of claim 8, wherein the first subprocess, the second subprocess, and the third subprocess include performing a similarity hashing.

13. The method of claim 1, further comprising storing the digital envelope corresponding to the machine learning system in a database.

14. The method of claim 13, wherein the database is a local database or a distributed database.

15. A system, comprising:
a processor configured to:
receive a header associated with the machine learning system, metadata associated with the machine learning system, and content associated with the machine learning system;

generate a digital envelope corresponding to the machine learning system based on the received header, the received metadata, and the received content associated with the machine learning system, wherein the generated digital envelope corresponding to the machine learning system includes a first value corresponding to the header associated with the machine learning system and a combined value corresponding to the metadata associated with the machine learning system and the content associated with the machine learning system, wherein the first value corresponding to the header associated with the machine learning system is unencrypted and the combined value corresponding to the metadata associated with the machine learning system and the content associated with the machine learning system is encrypted;

store the digital envelope corresponding to the machine learning system;

receive a header associated with a second machine learning system, metadata associated with the second machine learning system, and content associated with the second machine learning system;

generate a second digital envelope corresponding to the second machine learning system based on the received header, the received metadata, and the received content associated with the second machine learning system, wherein the generated digital envelope corresponding to the second machine learning system includes an additional first value corresponding to the header associated with the second machine learning system and an additional combined value corresponding to the metadata associated with the second machine learning system and the content associated with the second machine learning system, wherein the additional first value corresponding to the header associated with the second machine learning system is unencrypted and the additional combined value corresponding to the metadata associated with the second machine learning system and the content associated with the second machine learning system is encrypted; and compare the first value corresponding to the header associated with the machine learning system to the additional first value corresponding to the header associated with the second machine learning system to determine a provenance and authenticity of the second machine learning system; and a memory coupled to the processor and configured to provide the processor with instructions.

16. The system of claim 15, wherein the processor is further configured to generate a digital fingerprint associated with the machine learning system based on the header associated with the machine learning system, the metadata associated with the machine learning system, and the content associated with the machine learning system.

17. The system of claim 16, wherein generating the digital fingerprint associated with the machine learning system includes a first subprocess to generate the first value corresponding to the header associated with the machine learning system.

18. The system of claim 17, wherein generating the digital fingerprint associated with the machine learning system includes a second subprocess to generate a second value corresponding to the metadata associated with the machine learning system.

19. The system of claim 18, wherein generating the digital fingerprint associated with the machine learning system includes a third subprocess to generate a third value corresponding to the content associated with the machine learning system.

20. A computer program product embodied in a non-transitory computer readable medium and comprising computer instructions for:

receiving a header associated with the machine learning system, metadata associated with the machine learning system, and content associated with the machine learning system;

generating a digital envelope corresponding to the machine learning system based on the received header, the received metadata, and the received content associated with the machine learning system, wherein the generated digital envelope corresponding to the machine learning system includes a first value corresponding to the header associated with the machine learning system and a combined value corresponding to the metadata associated with the machine learning system and the content associated with the machine learning system, wherein the first value corresponding to the header associated with the machine learning system is unencrypted and the combined value corresponding to the metadata associated with the machine learning system and the content associated with the machine learning system is encrypted;

storing the digital envelope corresponding to the machine learning system;

receiving a header associated with a second machine learning system, metadata associated with the second machine learning system, and content associated with the second machine learning system;

generating a second digital envelope corresponding to the second machine learning system based on the received header, the received metadata, and the received content associated with the second machine learning system, wherein the generated digital envelope corresponding to the second machine learning system includes an additional first value corresponding to the header associated with the second machine learning system and an additional combined value corresponding to the metadata associated with the second machine learning system and the content associated with the second machine learning system, wherein the additional first value corresponding to the header associated with the second machine learning system is unencrypted and the additional combined value corresponding to the metadata associated with the second machine learning system and the content associated with the second machine learning system is encrypted; and comparing the first value corresponding to the header associated with the machine learning system to the additional first value corresponding to the header associated with the second machine learning system to determine a provenance and authenticity of the second machine learning system.

* * * * *